(12) United States Patent
Shah (10) Patent No.: US 7,307,980 B1
(45) Date of Patent: Dec. 11, 2007

(54) CHANGE OF CODEC DURING AN ACTIVE CALL

(75) Inventor: Nirat Bhupesh Shah, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/346,884

(22) Filed: Jul. 2, 1999

(51) Int. Cl.
*H04L 12/66* (2006.01)

(52) U.S. Cl. ..................................... 370/352

(58) Field of Classification Search ............... 370/352, 370/353, 356, 493; 379/93.08, 93.09, 100.12, 379/100.17, 220.01
See application file for complete search history.

(56) References Cited

U.S. PATENT DOCUMENTS

| | | | |
|---|---|---|---|
| 4,918,722 A | 4/1990 | Duehren et al. ............ 379/100 |
| 5,182,762 A * | 1/1993 | Shirai et al. ................ 375/222 |
| 5,291,546 A | 3/1994 | Giler et al. ................ 379/100 |
| 5,307,402 A * | 4/1994 | Cooper .................... 379/93.32 |
| 5,369,686 A | 11/1994 | Dutra et al. .................... 379/94 |
| 5,410,754 A * | 4/1995 | Klotzbach et al. .......... 370/466 |
| 5,418,842 A * | 5/1995 | Cooper .................... 379/93.33 |
| 5,488,651 A | 1/1996 | Giler et al. ................ 379/100 |
| 5,539,908 A * | 7/1996 | Chen et al. ................ 395/700 |
| 5,594,732 A | 1/1997 | Bell et al. .................... 370/401 |
| 5,625,678 A * | 4/1997 | Blomfield-Brown ..... 379/93.08 |
| 5,659,542 A | 8/1997 | Bell et al. .................... 370/496 |
| 5,691,916 A * | 11/1997 | Van Den Brink et al. .. 364/514 |
| 5,712,907 A | 1/1998 | Wegner et al. .............. 379/112 |
| 5,767,985 A | 6/1998 | Yamamoto et al. ......... 358/402 |
| 5,805,298 A | 9/1998 | Ho et al. .................... 358/402 |
| 5,812,278 A | 9/1998 | Toyoda et al. .............. 358/402 |
| 5,838,683 A | 11/1998 | Corley et al. ............... 370/408 |

(Continued)

FOREIGN PATENT DOCUMENTS

WO    WO 97/18665    5/1997

OTHER PUBLICATIONS

Hofmann, P et al "InGate: Integrating telephony and Internet" Protocols for Multimedia Systems, Nov. 24-27, 1997, pp. 261-264.*

(Continued)

*Primary Examiner*—Chi Pham
*Assistant Examiner*—Anh-Vu Ly
(74) *Attorney, Agent, or Firm*—Stolowitz Ford Cowger LLP (57) ABSTRACT

A router device is disclosed for use in a communication system having at least two telephone devices in communications with each other for transferring voice information therebetween through a packet switching network. The router device is coupled between one of the telephone devices and the packet switching network for performing one of a plurality of types of compression/decompression (codec) operation on information being transferred between the telephone devices. The router device includes a Digital Signal Processor (DSP) module responsive to an analog telephone signal for carrying a telephone conversation generated from one of the telephone devices and operative to convert the analog telephone signal to a digital telephone signal. The DSP packetizes the digital telephone signal for transmission to a remotely-located router device and switches from using a first type of codec to using a second type of codec upon detection of degradation in the quality of the voice information while a conversation is taking place between the two telephone device yet avoiding substantial disturbance to users of the telephone devices.

16 Claims, 6 Drawing Sheets

U.S. PATENT DOCUMENTS

| | | | | |
|---|---|---|---|---|
| 5,838,915 | A | | 11/1998 | Klausmeier et al. ... 395/200.45 |
| 5,838,994 | A | | 11/1998 | Valizadeh .................. 395/876 |
| 5,859,550 | A | | 1/1999 | Brandt ....................... 327/156 |
| 5,864,542 | A | | 1/1999 | Gupta et al. ................ 370/257 |
| 5,867,666 | A | | 2/1999 | Harvey ................. 395/200.68 |
| 5,933,803 | A | * | 8/1999 | Ojala ......................... 704/223 |
| 6,028,679 | A | * | 2/2000 | Murphy ..................... 358/407 |
| 6,175,856 | B1 | * | 1/2001 | Riddle ....................... 709/204 |
| 6,182,032 | B1 | * | 1/2001 | Rapeli ....................... 704/214 |
| 6,256,612 | B1 | * | 7/2001 | Vo et al. .................... 704/500 |
| 6,259,538 | B1 | * | 7/2001 | Amit et al. ................. 358/442 |
| 6,292,840 | B1 | * | 9/2001 | Blomfield-Brown et al. ............... 709/247 |
| 6,304,567 | B1 | * | 10/2001 | Rosenberg .................. 370/356 |
| 6,356,545 | B1 | * | 3/2002 | Vargo et al. ................ 370/355 |
| 6,377,573 | B1 | * | 4/2002 | Shaffer et al. ............. 370/356 |
| 6,381,266 | B1 | * | 4/2002 | Zhang et al. ............... 375/222 |
| 6,445,697 | B1 | * | 9/2002 | Fenton ....................... 370/357 |
| 6,483,600 | B1 | * | 11/2002 | Schuster et al. ........... 358/1.15 |
| 6,603,774 | B1 | * | 8/2003 | Knappe et al. ............. 370/466 |
| 6,633,582 | B1 | * | 10/2003 | Panburana et al. ......... 370/465 |
| 6,757,277 | B1 | * | 6/2004 | Shaffer et al. ............. 370/356 |
| 6,785,267 | B1 | * | 8/2004 | Knappe ...................... 370/353 |
| 6,856,612 | B1 | * | 2/2005 | Bjelland et al. ............ 370/338 |
| 7,023,839 | B1 | * | 4/2006 | Shaffer et al. ............. 370/356 |
| 2001/0008556 | A1 | * | 7/2001 | Bauer et al. ........... 379/265.06 |

OTHER PUBLICATIONS

Sheng, G. Z. et al "Intranet-Based Mail Fax Gateway Technology" Intelligent Processing Systems, Oct. 28-31, 1997, vol. 2, pp. 1607-1611.*

Cox, R. V. et al "On the Applications of Multimedia Processing to Communications" Proceedings of the IEEE, May 1998, vol. 86, Issue 5, pp. 755-824.*

\* cited by examiner

CHANGE OF CODEC DURING AN ACTIVE CALL

BACKGROUND OF THE INVENTION

1. Field of the Invention

The present invention relates generally to dynamically changing compression techniques used for transmission of voice information over a packet switching environment and for transmission of fax information on a telephone line, in real-time, the telephone line being also used for transmission of voice information over a packet switching network environment and particularly for loading an overlay compression layer during a telephone conversation upon user initiation or automatically.

2. Description of the Prior Art

Figure 1:
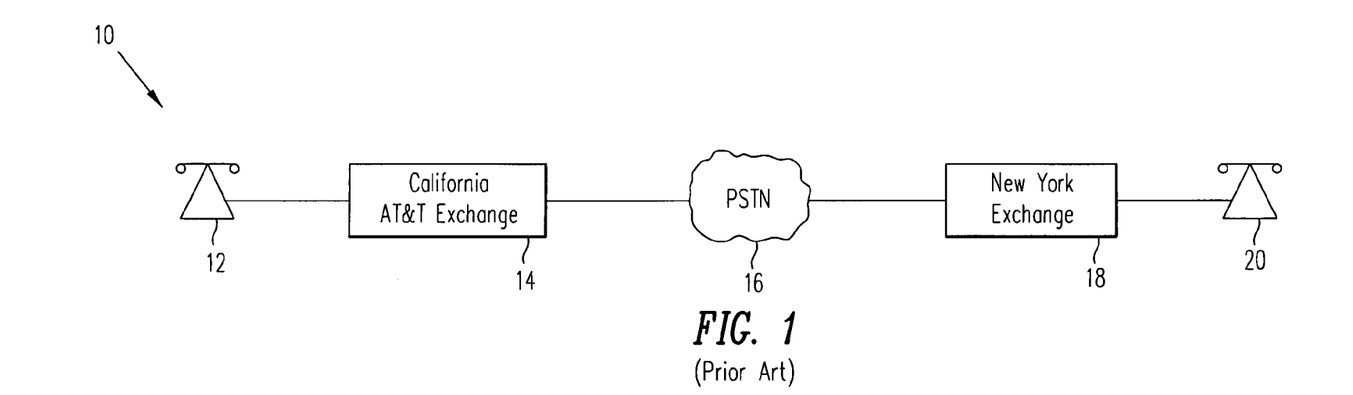
FIG. 1 shows a prior art system for transmitting voice information.

Prior art systems utilize various ways of transmitting voice information. One such way is shown in FIG. 1 wherein a telephone system 10 is shown to include a telephone device 12 coupled to a local telephone exchange, i.e. California AT&T exchange 14 (assuming the telephone device 12 is located in California). The latter is coupled through a PSTN 16 (Public Switching Telephone Network) to another exchange, namely, a New York telephone exchange 18 and finally, the exchange 18 is coupled to communicate voice information to a telephone device 20. This setup has been traditionally employed for communicating voice telephone calls between remotely located users of telephones, such as users of the telephone devices 12 and 20 (not shown in FIG. 1).

In operation, a user of the telephone device 12, located in California, might place a telephone call to a user of the telephone device 20, which may be located in New York. Once the call is initiated, a telephone transmission line establishes a connection between the telephone device 12 and the exchange 14. At the exchange 14, the telephone line might be multiplexed with a number of other physical lines and transmitted over the PSTN 16, which is comprised of switches, to the exchange 18, which is located in New York. The exchange 18 de-multiplexes the telephone line carrying the transmitted call and transfers the de-multiplexed signal to the telephone device 20.

The transmission of information through systems such as that shown in FIG. 1 is costly due to toll charges by telephone companies for placing calls through such systems.

Figure 2:
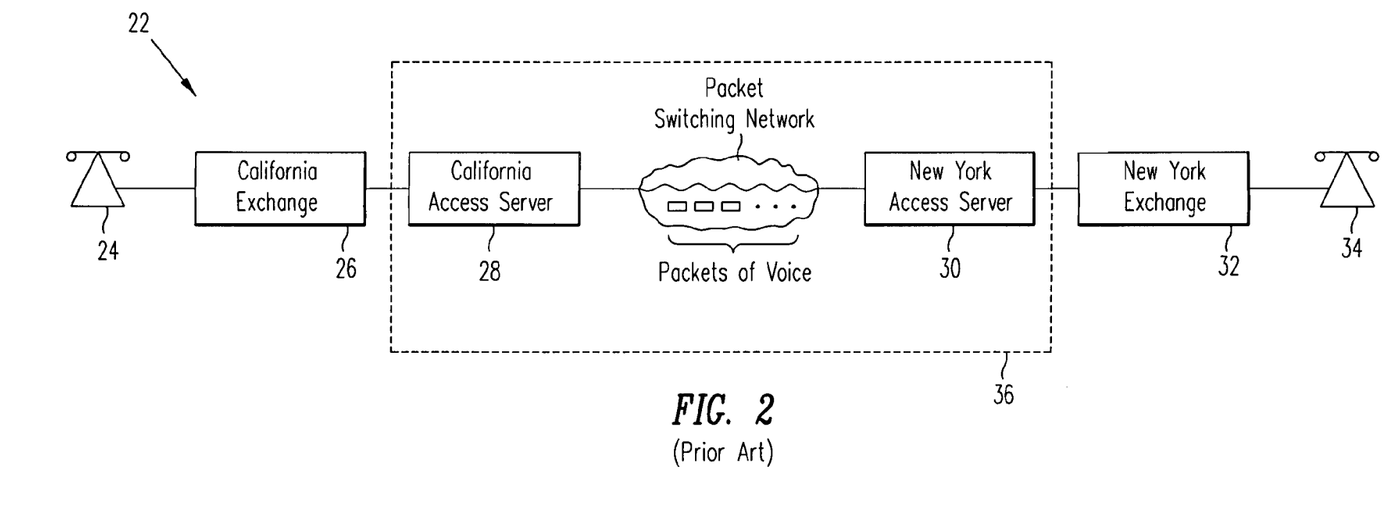
FIG. 2 shows a prior art communications system using packet switching network for transmission of voice information.

More recently, telephone conversations or modem information has been transmitted using packet switching network environments. An example of such a system is shown in FIG. 2 wherein a prior art telephone system 22 is shown to include a telephone device 24 coupled to an exchange 26, which is in turn coupled to a packet transmission system 36. The packet transmission system 36 is coupled to an exchange 32, which is coupled to a telephone device 34. The packet transmission system 36 is shown to include a California access server 28 and a New York access server 30.

In operation, a telephone call is placed by a user of the telephone device 24 and connected to the exchange 26. In this case, a user of the telephone device is again located in California and therefore the exchange 26 is located locally in California. The exchange 26 couples a multiplexed line with the phone call coupled thereon to the server 28. The server 28 is also locally located, i.e. in California, and operates to converts the voice information, which is received by the server 28 in analog format, to digital format and transforms the same to packets of voice information for transmission through a packet switching network, such as the Internet. The server 28 is a network device that typically includes a router for packetizing and de-packetizing information. Subsequently, the server 30 receives the packetized voice information that was transmitted through the packet switching network and the former de-packetizes (arranges the packets of a telephone call together into a continuous signal) the telephone call information and converts it into analog format for transmission to the exchange 32. The server 30 and the exchange 32 are located remotely from the exchange 26 and server 28. In this example, as the call is being placed between a California user and a New York user, the server 30 and the exchange 32 are located in New York. The server 30 also typically includes a router. The exchange 32 then transmits the voice information, in analog form to the telephone device 34. This type of voice transmission is commonly referred to as voice-over-IP (Internet Protocol). In comparing the prior art systems of FIG. 1 and FIG. 2, it should be noted that the PSTN 16 is essentially replaced with the packet transmission system 36. This difference in the two systems is, however, transparent to users of the telephone devices except that use of the system 22 in FIG. 2 is less expensive than that of the system 10 in FIG. 1. The reason for the cost reduction is that, referring to FIG. 2, the transmission of voice information from the telephone device 24 all the way to the server 28 is through local medium, which generates local phone costs. The same holds true for transmissions of voice information between the telephone device 34 and the server 30, as these are local within New York. Therefore, long distance charges are only incurred through the packet switching network, such as the Internet, which is generally a much less expensive medium of transmission relative to the public switching network.

In FIG. 2, the packets of voice information through the packet switching network, such as the Internet, are transmitted using various encoding techniques. In one encoding technique, packets are compressed by the server (for example, server 28) prior to transmission thereof. Consider the case where each packet is 200 bytes in length. A compression technique, such as one in the list provided hereinbelow, may compress each packet to 25 bytes. The goal is to decrease the size of the packets as much as possible while maintaining signal quality. Smaller packet sizes increase system throughput and therefore capacity as more packets can be routed through the network. Generally, undergoing any type of compression results in compromising voice quality. However, the difference in voice quality is not generally noticed by users listening to the voice transmission due to certain insensitivity associated with the human ear beyond certain frequencies. Although in the example provide hereinabove, a constant packet size, i.e. 200 bytes, is used, in practice, different packet sizes may be transmitted through the network.

A problem that arises with respect to prior art systems similar to FIG. 2 is that only one type of compression algorithm is employed for the duration of a phone call. That is, compression algorithms can not be changed during the phone conversation. The use of only one type of compression technique prevents compensation for variable factors, such as varying packet sizes. Therefore, the need arises for the use of dynamically changing compression techniques, either manually or automatically for transmission of voice-over-IP allowing for adjustments to be made in accordance with varying network sage or bandwidth thereby making optimal use of network capacity and throughput.

Compression and decompression are typically referred to as codec and examples of codecs used for compression/decompression of voice information are: G.711, G.723.1 and G729, etc. Typically, DSP devices perform codec functions.

Different codecs offer different advantages and disadvantages. For example, the G.711 codec actually performs no compression thereby leading to increased bandwidth. However, the quality of the voice transmission is as good as the original voice. Codecs are typically located in the router within the servers 28 and 30.

In the system of FIG. 2, fax information, as opposed to voice information, may be transmitted. In this respect, a fax machine is employed in place of the telephone device 24 and similarly, a fax machine is employed in place of the telephone device 34. In fax transmissions, a codec is loaded into the DSP followed by 'overlay'. 'overlay' converts the rate of transmissions of fax signals to the appropriate speed necessary for transmission of fax information over IP. When a fax call is initiated, the router within the server 28 detects a fax tone, which indicates that the information is fax information and accordingly places an 'overlay' on top of the already-compressed fax signal. Currently, a user of a telephone/fax device cannot transmit fax information over the same line that the user is utilizing for transmission of voice information. This serves as an inconvenience to the user as the user must place two calls, one for conducting a voice transmission and another for transmission of fax information. Moreover, if the user must fax a document urgently, while on the phone, the user must hang up the voice call, fax the document and then make a third call to resume the voice call. Accordingly, the need arises to transmit fax information, in real-time, over a telephone line that is being used to transmit voice information in a packet switching network environment.

For the foregoing reasons, the need arises for employing dynamically varying compression techniques, either manually or automatically, in packet switching network environments allowing for adjustments to be made by varying the compression technique in accordance to the usage of the network. A further need arises for transmission of fax information, on-the-fly (or in real-time), over the same telephone line that is being used to transmit voice information in a packet switching network.

SUMMARY OF THE INVENTION

Briefly, a router device is disclosed in accordance with an embodiment of the present invention for use in a communication system having at least two telephone devices in communications with each other for transferring voice information therebetween through a packet switching network. The router device is coupled between one of the telephone devices and the packet switching network for performing one of a plurality of types of compression/decompression (codec) operation on information being transferred between the telephone devices. The router device includes a Digital Signal Processor (DSP) module responsive to an analog telephone signal for carrying a telephone conversation generated from one of the telephone devices and operative to convert the analog telephone signal to a digital telephone signal. The DSP packetizes the digital telephone signal for transmission to a remotely-located router device and switches from using a first type of codec to using a second type of codec upon detection of degradation in the quality of the voice information while a conversation is taking place between the two telephone devices yet avoiding substantial disturbance to users of the telephone devices.

The foregoing and other objects, features and advantages of the invention will be apparent from the following detailed description of the preferred embodiments which made reference to the several figures of the drawing.

DETAILED DESCRIPTION OF THE PREFERRED EMBODIMENTS

Figure 3:
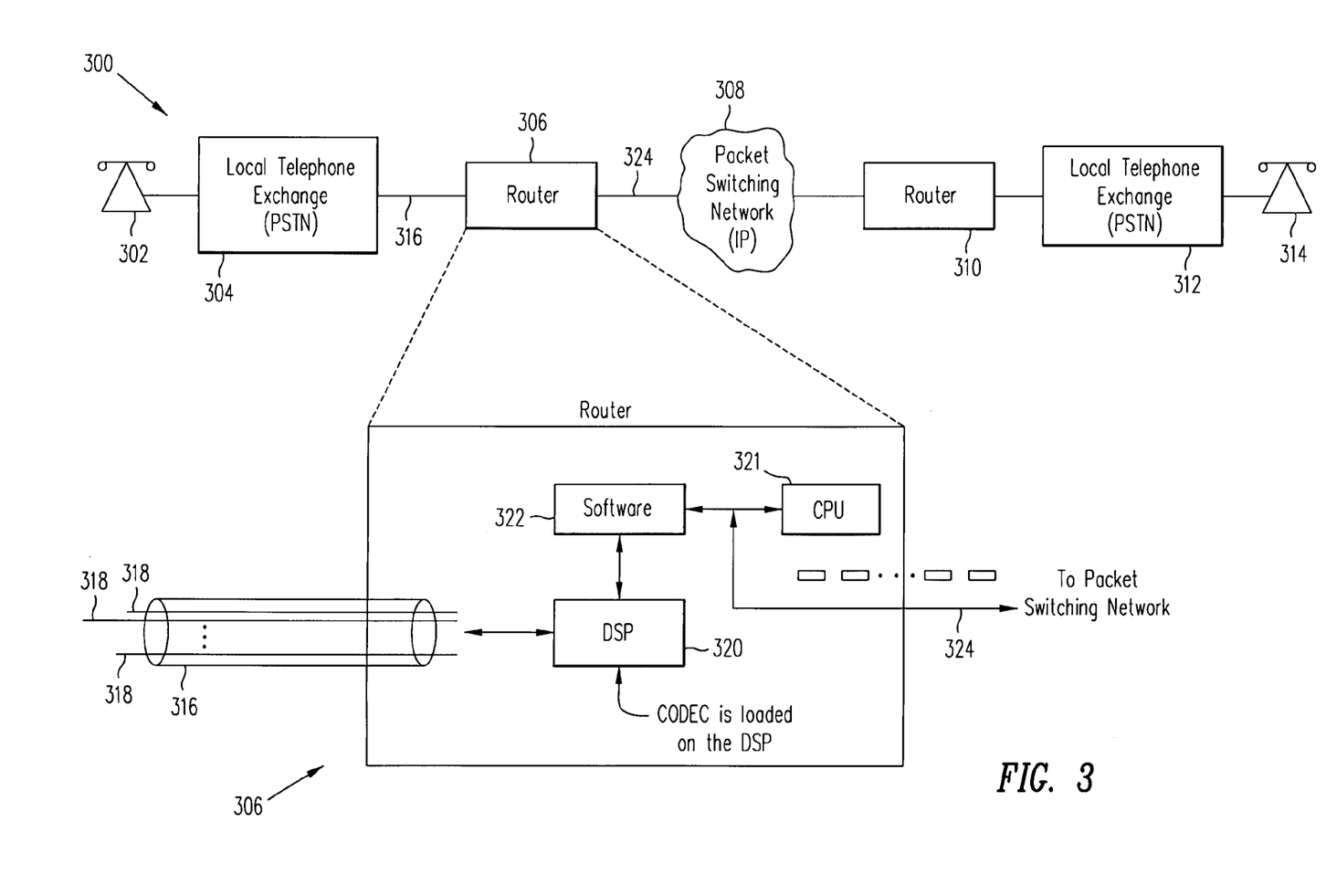
FIG. 3 shows a communication system 300 in accordance with an embodiment of the present invention.

Referring now to FIG. 3, a communication system 300 is shown to include a telephone device 302, a local telephone exchange 304, a router device 306, a packet switching network 308, a router device 310, a local telephone exchange 312 and a telephone device 314 in accordance with an embodiment of the present invention. The exchanges 304 and 312 are the telephone companies' equipment including switches for multiplexing and transferring calls placed through telephone devices coupled to the exchanges. The environment used to conduct such transfer and multiplexing is referred to as Public Switching Telephone Network (PSTN). The network 308 is a packet switching network and in one embodiment of the present invention, the network 308 is the Internet wherein information is passed therethrough using Internet Protocol (IP). The communication system 300 operates to transfer voice information, i.e. telephone calls, between users of the telephone devices 302 and 314.

For example, when a user of the telephone device 302 (not shown in FIG. 1) initiates a call, telephone signals carrying voice information are transmitted to the exchange 304. Switches (not shown in FIG. 1) in the exchange 304 multiplex the signal using Time Division Multiplexing (TDM) in order to connect the telephone call to the router 306. The router 306 receives information in analog format and converts the same to digital format. This conversion may be performed using analog-to-digital converter devices (not shown) or the DSP. The digital information is then packetized. An IP header information including an address of the destination of the packet will be appended to each packet and the packets with the appended header are then transmitted across the packet switching network. IP is used as a routing protocol, however, any other appropriate protocol known by those skilled in the art can be used. The software stored in the space 322 causes appending of the packets with header information and transmission thereof throughout the network.

Portions of the phone call are placed in packets for transmission through the network 308 and for receipt by the router 310. The router 310 receives the packets and the DSP module of the router 310 organizes the separately-arriving packets back into the original contents of the call and converts the de-packetized signal to analog format. The router 306 identifies the final destination to which the packets must be sent. Each packet of a telephone conversation may travel through different equipment prior to reaching its ultimate destination, in this case the router 310. In FIG. 3, the final destination is identified by the router 306 as the address (the IP address) of the router 310. Different packets of the same message can travel through different routes within the network 308. The analog de-packetized signal is then transferred through the exchange 312 to the telephone device 314.

For transmission of voice in the opposite direction, i.e. from the telephone device 314 to the telephone device 302, operations such as those described above take place except the router 310 sends packets that are destined for receipt by the router 306.

The exchange 304 and router 306 are typically situated locally with respect to the telephone 302 and the exchange 312 and router 310 are situated locally with respect to the telephone device 314. But the telephone 302, the exchange 304 and the router 306 are located remotely to the router 310, the exchange 312 and the telephone device 314. While not shown in FIG. 3, it should be understood by those skilled in the art that the exchanges 304 and 312 are typically coupled to many telephone devices.

In FIG. 3, the router 306 is shown in more detail to include a DSP module 320, a Central Processing Unit (CPU) 321 and a software storage space 322. The DSP module 320 converts voice signals into packets and vice versa. The CPU 321 routes packets that are generated by the DSP module 320 through the network 308 and similarly transfers packets received from the network 308 to the DSP module 320. The DSP module 320 operates under the command of the CPU 321 to perform its tasks. Software (or firmware) code is stored in the space 322. The stored software includes one or more types of codec algorithms (depending on which codecs are supported by the router) and further includes code executed by the CPU 321 for performing CPU tasks.

It should be noted that the router 310 generally includes the same components and operates in the same manner as that which is disclosed regarding the router 306. The router 306 is coupled to the telephone device 302 through one or more trunks with each trunk 316 carrying many telephone channels. An example of a trunk line is a T1 or T3 line. A T1 line includes 24 channels and a T3 line includes 28 T1 channels, or 672 channels. Each channel 318 is typically DS0 (Digital Subscriber) line. The trunk 316 carries information between the telephone device 302 and the router 306 in analog form. Within the router 306, analog information is converted to digital form by the DSP module 320. The DSP module 320 generally includes a number of DSP chips (or integrated circuits), which are special purpose processors for efficiently executing mathematical operations, such as multiply and add operations, in one clock cycle. The DSP module 320 uses software (or firmware) code stored in the space 322 for execution thereof to carry out various functions. For example, the DSP module 320 loads a particular codec from the space 322. Alternatively, the CPU 321 commands the DSP module 320 to load the codec. The software code is a program that controls the DSP chips and identifies which codec is to be used and identifies the address of the destination of the packets coming out of the DSP through the network 308. A header (IP header) is added to the voice information prior to transmitting the same that contains the destination address of the packet.

The DSP module 320 also places the voice packets provided by the CPU 321, which received the packets through the network 308, onto the trunk 316 when information is being transmitted from the telephone device 314 to the telephone device 302. As noted earlier, the router 310 essentially includes the same components as those discussed relative to router 306. However, when receiving information through the network 308, the DSP module in the router 310 first arranges the packets together to reconstruct the continuous form of the original call and then converts the de-packetized information, which is still in digital format, into analog format. A program from the software stored in the space 322 for performing compression/decompression (or codec) is loaded into the DSP module 320 for use in compressing out-going packets and de-compressing in-coming packets of information. The codec function is performed by the DSP module by loading a software program that carries out the compression/decompression when executed.

As noted above, various codec techniques are currently available and used by the industry-at-large. Different codecs yield different packet sizes due to the type of algorithm employed. Some of the common types of codec protocol are listed below:

| CODEC (Protocol) | Packet Rate |
|---|---|
| G.711 (uses a-law/u-law encoding) | 64 Kbits/sec |
| G.726 (uses ADPCM encoding) | 16/24/32 Kbits/sec |
| G.729 | 8 Kbits/sec |
| G.723.1 | 6.3/5.3 Kbits/sec |

The packet rate is proportional to the size of the packet (the higher the bit-rate, the higher the packet size). The packet size after compression is a function of the sophistication of the particular compression algorithm. As noted above, for example, the G732.1 technique yields a smaller packet size than the G.711 compression technique. While a smaller packet size increases system capacity and throughput, the quality of voice is compromised. Thus, the G.711 is likely to yield a better quality voice transmission than the G723.1. It should be noted that whichever codec is utilized by the router 306 is also used by the router 310 to decompress the transmitted packets.

Figure 4:
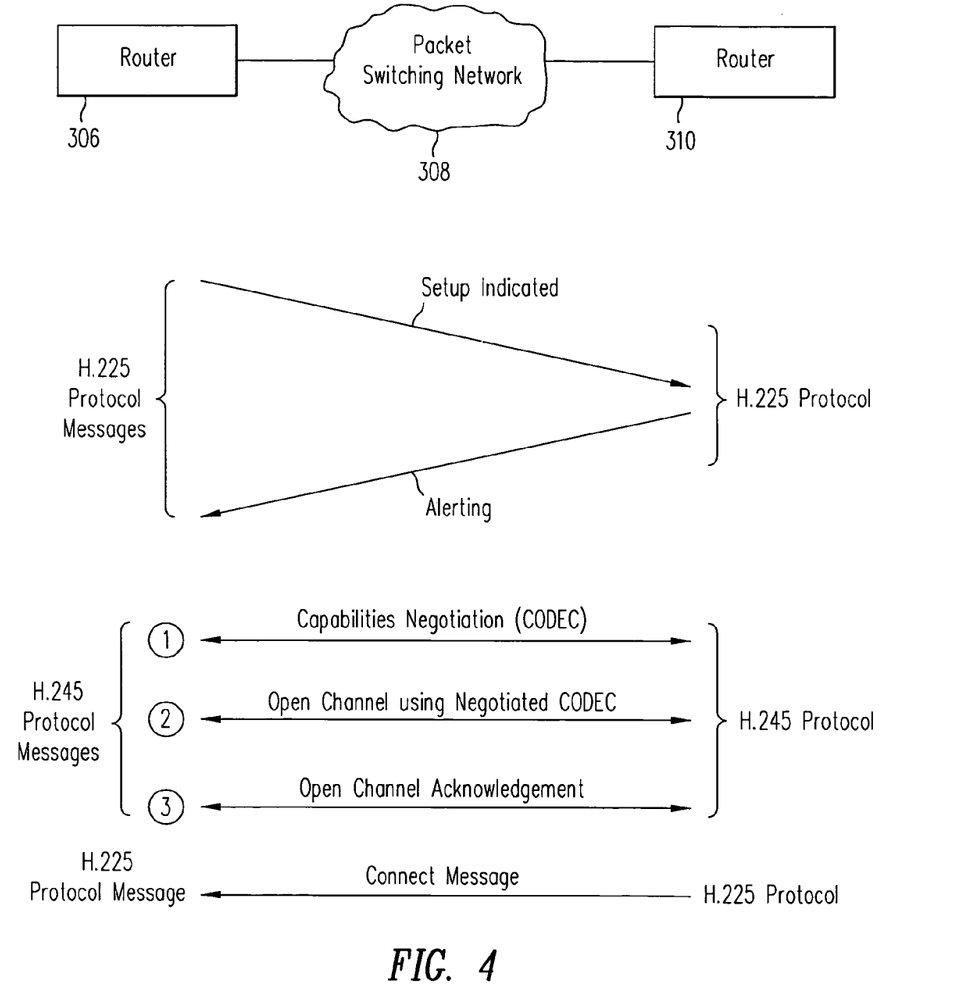
FIG. 4 shows and describes the way in which a call is established using the embodiment of FIG. 3.

FIG. 4 shows the routers 306 and 310 in communication through the network 308. In FIG. 4, the way in which a call is established is depicted using a protocol, the H.323 protocol, which is a standard protocol used for connecting and disconnecting voice and video calls. In this case, it is being used for voice-over-IP applications. As a part of the H.323 protocol, two other protocols, the H.225 and H.245 are employed. The H.225 is used for call set-up and the H.245 protocol is used for codec negotiation as will be apparent shortly.

Consider the case where the router 306 wishes to send voice information, in packet form, through the network 308, to the router 310. First, as shown in FIG. 4, the CPU of the router 306 transmits a 'setup indication' message to the router 310 pursuant to the protocol specified by H.225. The router 310, in response thereto, sends an 'alerting' message back to the router 306, which indicates that the router 310 has received the 'setup' message from the router 306.

Further shown in FIG. 4, the routers 306 and 310 subsequently communicate pursuant to the H.245 protocol for negotiations of their capabilities and to decide on use of a set of common capabilities. That is, both routers simultaneously send each other the codec(s) that each is capable of supporting. This may be one or more types of codecs. Next, a mutually-supported codec is decided upon for use by the routers using the H.245 protocol. Still using this protocol, in response to the decided codec, an acknowledgment is sent. In FIG. 4, the 'capabilities negotiations' messages and the 'open channel' messages are transmitted irrespective of receipt of any response, i.e. they are unsolicited messages, whereas, the 'acknowledgment' message is sent in response to the 'open channel' message.

Finally, a connection is established and a message, in accordance with the H.225 protocol, is sent from one router to another. In the current example, this 'connect' message would be sent from the router 310 to the router 306.

In the above scenario with respect to FIG. 4, the routers negotiate the codec to be used and as will be apparent shortly, the routers may change the type of codec being used during connection time but the new codec would have to be supported by both the sending as well as the receiving router since both routers need to use the same codec at any given time. It should be obvious to those skilled in the art that in the embodiment provided above, the router 306 may be sending information at one time and receiving information at another time and the same holds true for the router 310.

Referring back to FIG. 3, each of the packets have a time stamp and a sequence number associate therewith. The time stamp is used by the DSP module of the router to determine the delay associated with the packet's reaching its destination. For example, when a packet is received, the DSP of the receiving router knows the time of arrival of the packet and can subtract the number indicated by the packet's time stamp from the time of arrival to determine how long it took for the packet to get to its destination. The sequence number is used for determining which packets of a message have arrived and it is further used to re-organize the packets into the original message. Each message will have a predetermined number of packets associated with it and if any of those packets are missing when the packets' sequence numbers are evaluated, the router knows that one or more packets (depending on how many are missing) have been dropped. The receiving router may use this information to switch to a different codec. There are different reasons for triggering the occurrence of a switch from one codec type another. One reason may be when the DSP module detects a loss or an intolerable delay in the arrival of the packets, i.e. beyond a predetermined threshold value, the DSP module sends a special message to the CPU to this effect and proceeds to negotiate and switch codecs. Alternatively, the CPU, on a continuous basis, requests (by sending a request messages) packet delay information and loss of packet information from the DSP module. For example, the CPU may do so every couple of seconds and the DSP module responds to these requests accordingly. When the CPU detects loss or delay beyond a certain threshold value, it initiates re-negotiation for a different codec. Typically, as the loss/delay increases, a codec type that results in a smaller packet size will be employed.

In one embodiment of the present invention, a threshold is set for triggering a change of and re-negotiation of the codec. The threshold may be based upon the number of missing packets or a predetermined tolerable delay in the packet's arrival beyond which the system performance is substantially degraded. Either of these cases or perhaps both can be factored into the threshold and when the threshold is reached, the sending and receiving routers re-negotiate the use of a different codec. The threshold is user-programmable.

Alternatively, the user of the sending or receiving router may change the type of codec being employed. This again may happen due to a drop in packets, as detected by the user, and/or too long of a delay associated with the arrival of the packets. The user can detect these scenarios by hearing a delay in the voice or a degradation of voice quality where packets are being dropped. In the latter case, the user may hear choppiness in the voice transmission. Each type of codec has a programmably-alterable predetermined code associated therewith. Typically, the Internet Telephony Service Providers (ITSP) can alter the predetermined code whereas the user cannot do the same. This code is preferably a numeric value whereby when the user detects a degradation in voice quality, the user enters the predetermined code corresponding to a codec the user wishes to switch to by entering the predetermined code numeric value into the keypad of the telephone the user is employing. The CPU of the router receiving the user's input is, at all times, ready to accept such codes from the user. Receipt of the code by a router signifies that the codec need be re-negotiated. Telephones generally transmit a user-entered number by using Dual Tone Mode Frequency (DTMF). Upon the user's entering the code associated with a different type of codec, the routers switch to the latter if it is commonly supported by both routers. The assignment of a code to a particular type of codec is programmable. For example, the value '11' can be assigned to the codec type G.711 such that if the user enters '11', the (CPU within the) router starts to negotiate and switch to using the G.711 codec by loading the same into the DSP module. This occurs during the phone conversation but switching to a different codec does not cause a substantial disturbance to the user as it only takes approximately 200 milliseconds (which cannot be heard) to switch to a different codec. Essentially, a different software code, associated with the user-specified codec, is downloaded to the DSP module 320 (in FIG. 3).

Figure 5:
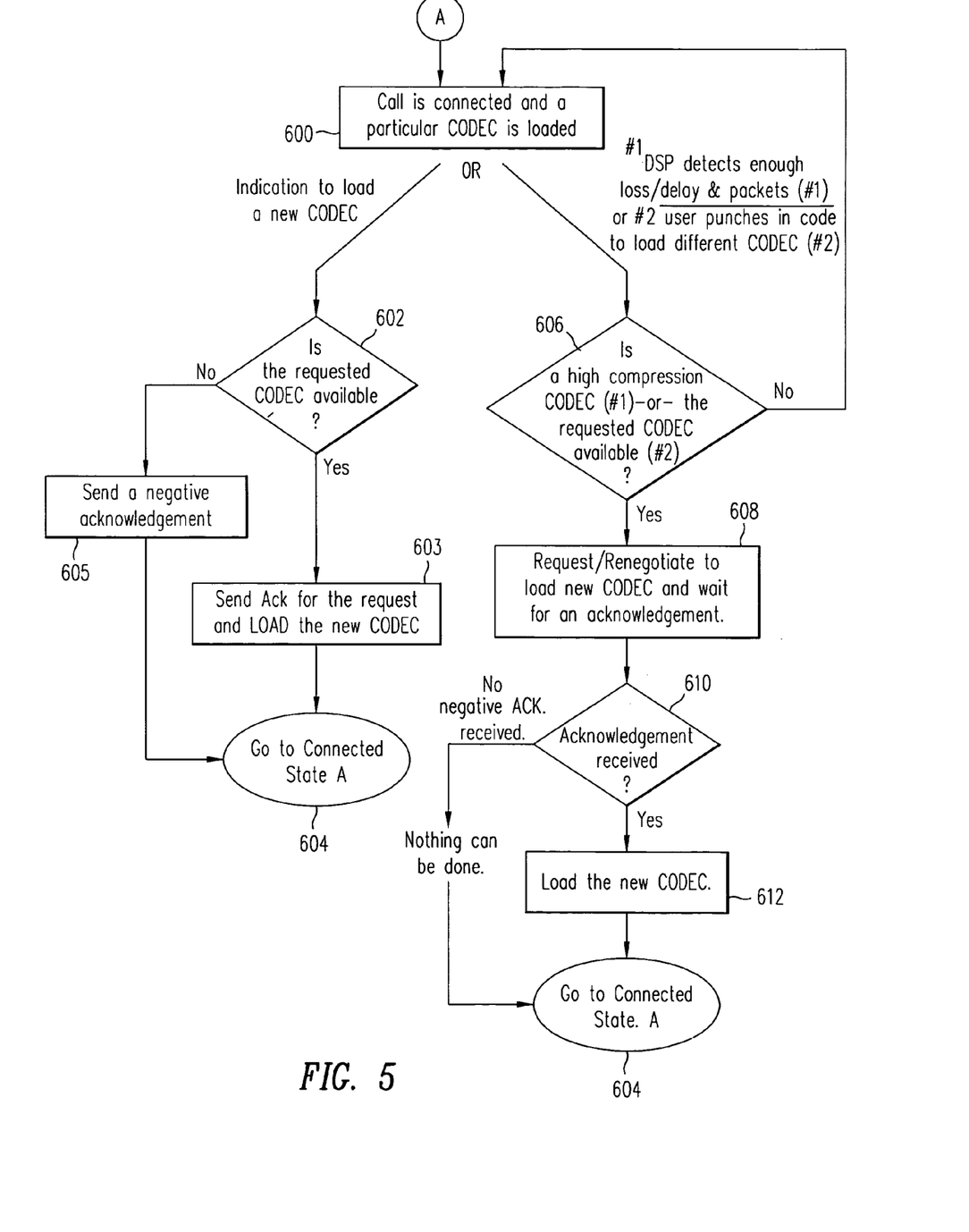
FIG. 5 shows a flow chart outlining the steps processed in implementing dynamic codec negotiation and switching in accordance with an embodiment of the present invention.

In FIG. 5, a flow chart is shown of the steps processed in implementing dynamic codec negotiation and switching described above. At step 600, the call is connected and a particular codec is loaded into the DSP modules of the sending and the receiving routers and the CPU (of the routers) send and receive packets from the DSP module and the network. At step 606, if a router detects an unacceptable amount of delay in packet arrivals or packets being dropped (both of which will result in the router requesting a higher level of compression codec to be switched to and used and shown in FIG. 5 as #1) or alternatively (shown in FIG. 5 as #2), if a user requests a different codec by entering the predetermined code assigned to the codec of interest (by the ITSP), the process continues to step 608. At step 608, a request is made for re-negotiation of a different codec where the new codec is loaded into the DSP module awaiting for an acknowledgment from the other router. Assuming both the sending and the receiving routers support the requested codec, both will load the codec. If one or both of the sending and receiving routers do not support the requested codec, at 606, the process will take the 'no' branch and will not attempt to load a new codec. Connection between the routers, however, continues and the call is not disconnected. Even in the case where negotiations begin for a new codec, the call is not disconnected. In fact, the reader should note that the codec negotiations and switching occurs while the call is connected.

At step 608, the router waits for an acknowledgment and at 610, a determination is made as to whether or not the acknowledgment has been received. If so, the next step is 612 at which time the new or requested codec is loaded into the DSP module and operation of the system will continue using the newly-loaded codec. If on the other hand, at 610, no acknowledgment is received, nothing can be done and the process goes back to step 600. Again, the call remains connected.

In FIG. 5, after step 600, the steps shown in the right-hand side of the flow chart (as described above) represent the steps performed by the router detecting a degradation in voice quality and wishing to switch to a different codec and the steps shown in left-hand side of the flow chart represents the steps performed by the router being informed of switching to a different codec from the other router—the steps listed in the right-hand side of the flow chart occur first followed by the occurrence of the steps of the left-hand side of the flow chart. The call is connected and the CPU (of the router) detects an H.245 message from the other router indicating that the new codec need be loaded. At 602, it is determined whether the requested codec is available and if so, an acknowledgment is sent, at step 603, by the router receiving the request to change codecs and the new codec is loaded into the DSP module and the process continues to step 600. But if at 602, it is determined that the requested codec is not supported, the router receiving the request for the change in codecs sends a negative response to indicate that the new codec is not available to it and the process continues to step 600.

The steps shown in FIG. 5 are caused to be performed by the CPU of respective routers by executing the software that is stored in the space 322 (shown in FIG. 3) of respective routers.

Figure 6:
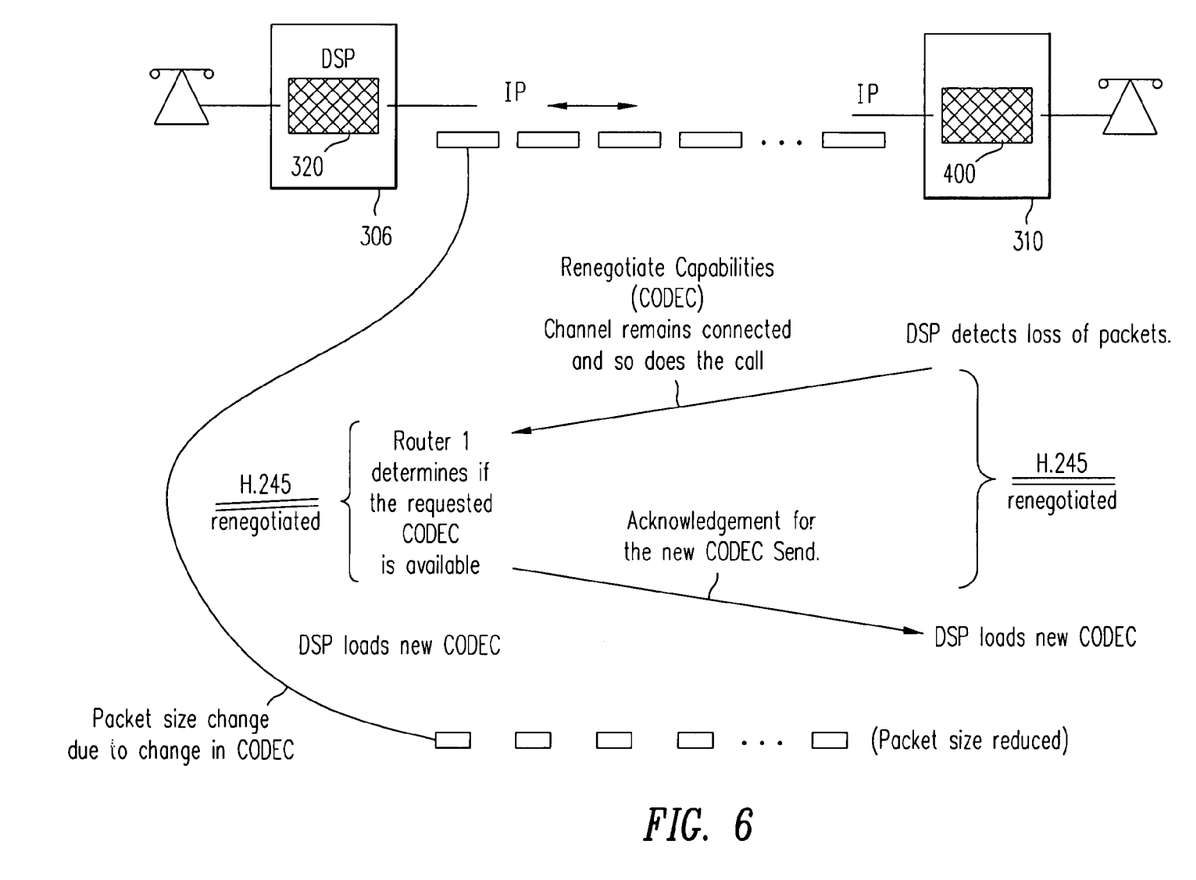
FIG. 6 illustrates the change in packet size after a change in codec has occurred in accordance with the teachings of the present invention.

FIG. 6 is presented to illustrate the change in packet size after a change in codec has occurred. In this example, the routers 306 and 310 communicate over a packet switching network using IP and the packet sizes initially are shown to be larger in size than after switching to a different codec. In this case, routers 306 and 310 negotiate the use of a new codec so that the system capacity and throughput is increased by using a compression technique leading to a smaller packet size.

It should be noted that a similar flow chart can be used to perform the opposite. Consider the case where a type of codec is being executed that compensates for either packet loss or pursuant to a user request, if, after sometime, the quality of information transfer over the network improves such that more bandwidth becomes available, another codec that results in larger packet sizes but a higher quality of transmission may be negotiated therefore and loaded.

For automatic detection of better network bandwidth availability, statistics from the DSP module can be used and a threshold based upon such statistics can be set to trigger a switch from a higher quality codec to a lower quality codec.

Figure 7:
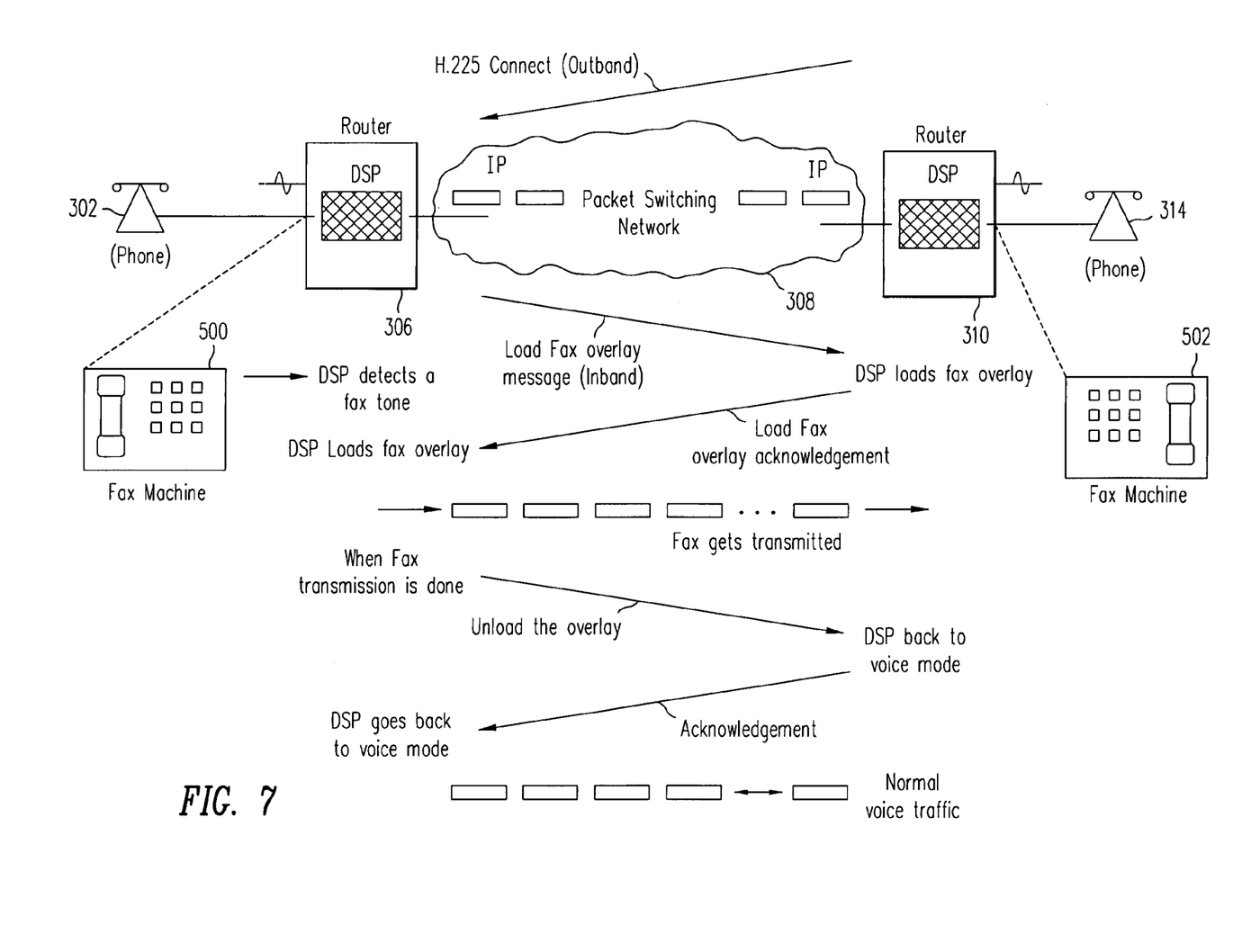
FIG. 7 shows an alternative embodiment of the present invention wherein a fax transmission takes place on the same telephone line as that which is for carrying voice information.

In yet another embodiment of the present invention, as shown in FIG. 7, while a telephone call is taking place through routers and the packet switching environment, fax information is transmitted from one router to another while the call is connected. In this respect, a user of telephone that is coupled to one of the routers need not disconnect the phone call, make another call for sending a fax and initiate another call to resume conversation.

In FIG. 7, routers 306 and 310 are shown coupled to a telephone and a fax device. More specifically, the router 306 is shown coupled to the telephone device 302 and a fax machine 500 and the router 310 is shown coupled to the telephone 314 and the fax machine 502. The routers 306 and 310 communicate through the packet switching network 308. Consider the case where a user of the telephone device 302 is conducting a telephone conversation with a user of the telephone device 314 through the apparatus shown in FIG. 7 between the two telephone devices. At the same time the user of the telephone device 302 wishes to fax a document to the user of the telephone device 314 who has access to receive faxes at the fax machine 502. The router 306 detects the presence of a fax signal by noting the presence of a fax tone and subsequently transmits a message to have a fax overlay loaded. The message is transmitted through the network 308 and it is received by the router 310. When the router 310 receives the fax overlay message, the DSP module of the router 310 loads a fax overlay and transmits a fax acknowledgment message onto the network 308 for use by the router 306. Upon receiving the acknowledgment message, the DSP module of the router 306 loads a fax overlay and the fax is transmitted from the router 306 to the router 310 through the network 308. Fax overlay essentially includes overhead information for transmission of faxes. One such overhead information, for example, includes adjustments to frequency or rate of transmission due to the difference in the frequencies between voice and fax transmissions.

In FIG. 7, after the fax has been transmitted, the overlay is unloaded by both routers and an acknowledgment is transferred from the router 310 to the router 306 indicating that the router 310 is now back to voice mode. At this time, upon receiving the acknowledgment, the router 306 also goes back to voice mode and users of the telephone devices 302 and 314 can resume their conversation.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

I claim:
1. A device comprising:
a Digital Signal Processor (DSP) module to receive an analog telephone signal to convert the analog telephone signal to a digital telephone signal and further to packetize the digital telephone signal for transmission to a remotely-located device;
the device and the remotely-located device to negotiate a first type of codec by each sending to the other a list of one or more types of codecs that each supports and each deciding to use a mutually supported codec through the use of a predetermined protocol; and
during communications between the remotely-located device and the DSP module, the DSP module to renegotiate a second type of codec, wherein the renegotiation is triggered upon detection of degradation in voice quality by the remotely-located device, and
the DSP module to dynamically switch to the second codec only if the device determines that the second codec is available therein,
wherein, the type of codec being utilized repeatedly, mutually, renegotiated to dynamically change compression techniques and switching between the codecs is performed during a call.
2. A device as recited in claim 1 wherein switching between the codecs is initiated by a user of one of the telephone devices.
3. A device as recited in claim 2 wherein a predetermined code is assigned to correspond to each codec wherein the user specifies the type of codec to be switched to by entering the predetermined code corresponding to a desired codec.
4. A device as recited in claim 3 wherein the predetermined code is programmably-alterable.

5. A device as recited in claim 1 further comprising the device to switch from a codec resulting in the use of larger packet sizes to a codec resulting in smaller packet sizes in response to detecting a lower available bandwidth on a packet switching network.

6. A device as recited in claim 5 wherein the device is configured to automatically detect the lower bandwidth.

7. A device as recited in claim 1 wherein upon detecting higher bandwidth available on packet switching network, the device to switch from a codec resulting in the use of smaller packet sizes to a codec resulting in higher packet sizes.

8. A device as recited in claim 7 wherein the device to automatically detect the higher bandwidth.

9. A device as recited in claim 1 wherein the remotely-located device to detect the degradation in the quality of voice information.

10. A device as recited in claim 1 wherein the degradation in the quality of voice information is due to loss of one or more packets.

11. A device as recited in claim 10 wherein a threshold defines the number of lost packets that are tolerated and the device to trigger a decision to switch to the second type of codec.

12. A device as recited in claim 11 wherein a plurality of packets form a message and each packet includes a sequence number indicative of the position of the packet with respect to other packets in the same message, the sequence numbers of the same message being in sequential order wherein a loss of packets is detected when one or more sequence numbers are missing from the received packets of the same message.

13. A device as recited in claim 1 wherein the degradation in the quality of voice information is due to an intolerable delay associated with the time for a packet to travel between the device and the remotely located device.

14. A device as recited in claim 1 wherein the codec negotiation is performed pursuant to the H.245 protocol.

15. A device as recited in claim 1 wherein the first type of codec includes a compression/decompression algorithm defined by any one of the standards: G.711, G726, G729 or G723.1 and the second type of codec utilizes a compression/decompression algorithm defined by any one of the standards: G.711, G726, G729 or G723.1.

16. A method comprising:

receiving at a first router an analog telephone signal through a telephone connection from a first telephone device;

converting the analog telephone signal to a digital telephone signal;

separating information carried on the digital telephone signal into packets of information;

initially, mutually, negotiating with a second router a first type of codec for communication with a second telephone device, by each sending to the other one or more types of codecs that each supports and each deciding to use a mutually supported codec through the use of a predetermined protocol;

using a first type of codec for transferring the packets of information between the first and second router through a packet switching network;

during communication between the telephone devices, the first and second router renegotiating the use of a second type of codec, wherein the renegotiation is triggered upon detection of degradation in voice quality by the second router;

switching to using the second type of codec only if the first router determines that the second codec is available therein; and during communication between the telephone devices, upon further detection of degradation in voice quality by the second router, repeatedly renegotiating to dynamically change compression.

\* \* \* \* \*